United States Patent
Yandell

(10) Patent No.: US 7,879,230 B2
(45) Date of Patent: Feb. 1, 2011

(54) VACUUM-ACTUATED LIQUID DISINFECTANT DISPENSER AND SYSTEM

(76) Inventor: Cecil Yandell, 188 Arnold Rd., Goliad, TX (US) 77963

( * ) Notice: Subject to any disclaimer, the term of this patent is extended or adjusted under 35 U.S.C. 154(b) by 712 days.

(21) Appl. No.: 11/934,357

(22) Filed: Nov. 2, 2007

(65) Prior Publication Data
US 2009/0065410 A1 Mar. 12, 2009

Related U.S. Application Data

(60) Provisional application No. 60/971,365, filed on Sep. 11, 2007.

(51) Int. Cl.
*C02F 9/04* (2006.01)
(52) U.S. Cl. ................ 210/127; 210/128; 210/205
(58) Field of Classification Search ............. 210/97, 210/127, 128, 207, 205
See application file for complete search history.

(56) References Cited

U.S. PATENT DOCUMENTS

| | | |
|---|---|---|
| 6,627,071 B1 | 9/2003 | Braden |
| 6,932,912 B2 | 8/2005 | Chaffin |
| 7,837,867 B2 * | 11/2010 | McKinney .................. 210/101 |
| 2006/0196816 A1 * | 9/2006 | Davis ....................... 210/198.1 |
| 2008/0035539 A1 | 2/2008 | Chaffin |

* cited by examiner

Primary Examiner—Terry K Cecil

(57) ABSTRACT

A vacuum-actuated liquid chlorine dispenser for use in an aerobic treatment system. Effluent is diverted from a discharge pipe in an aerobic treatment system into an inlet of a venturi chamber. The resulting pressure differential resulting from effluent flowing through the venturi chamber is communicated to a dosage container, which results in disinfectant flow from a reservoir into the dosage container until the volume of disinfectant contained by the dosage container causes a pressure control device, such as a float valve, to inhibit further pressure communication. Thereafter, the accumulated disinfectant within the dosage container egresses through a disinfectant outlet that may include a flow regulation device such as a drip emitter or check valve. The present invention allows for more regular dosing of known and accurate disinfectant amounts following each pumping cycle of the aerobic treatment system.

20 Claims, 4 Drawing Sheets

VACUUM-ACTUATED LIQUID DISINFECTANT DISPENSER AND SYSTEM

CROSS-REFERENCES TO RELATED APPLICATIONS

This original nonprovisional application claims the benefit of U.S. provisional application No. 60/971,365, filed Sep. 11, 2007 and entitled "NG 300 V Chlorine Dispenser," and which is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates generally to an apparatus for use with aerobic treatment systems. More specifically, the invention relates to a vacuum-actuated liquid disinfectant dispenser for treating sewage wastewater prior to discharging effluent into the environment.

2. Description of the Related Art

Aerobic treatment systems treat wastewater using natural processes that require oxygen. Bacteria work to break down and digest the wastewater inside the aerobic treatment unit. Because these bacteria flourish in high-oxygen environments, aerobic treatment systems require air to be injected into the system to facilitate the breakdown of wastewater. Even after breakdown, however, the treated wastewater leaving the unit requires additional treatment or disinfection before being returned to the environment.

Most aerobic treatment systems include a main compartment called an aeration chamber in which injected air is mixed with wastewater. Because most home aerobic units are buried underground, the air is forced into the aeration chamber by an air compressor or mixed by liquid agitation. The forced air mixes with wastewater in the aeration chamber, and the oxygen supports the growth of aerobic bacteria that digest most of the solids in the wastewater.

Because the bacteria cannot digest all of the solids, the undigested solids eventually settle out as sludge. Many aerobic units include a secondary chamber called a settling chamber or holding chamber where excess solids can settle. Other designs allow the sludge to accumulate at the bottom of the tank. In aerobic units designed with a separate settling compartment, the sludge returns to the aeration chamber (either by gravity or by a pumping device). The sludge contains bacteria that also aid in the treatment process.

As the sewage separates into liquid and solid components, the liquid is collected into the separate holding chamber where it can be pumped back to the surface or into a leach field. Prior to discharge, however, the liquid must be treated with chlorine or similar disinfectant to produce an antiseptic output. Only after disinfecting can the liquid be safely discharged into the environment.

Until recently, the typical method of treating wastewater within an aerobic system was to cause the wastewater to come into contact with chlorine tablets, but chlorine in tablet form has traditionally been more difficult and expensive to acquire in solid form vis-à-vis chlorine in liquid form, such as common household bleach. Accordingly, regulation of such systems has been relaxed to allow the increased use of liquid chlorine in aerobic treatment systems. Liquid chlorine has lower cost than chlorine in tablet form and is more readily available.

Several patents have addressed the use of liquid chlorine in such systems. U.S. Pat. No. 6,932,912 (the '912 patent), for example, provides a wastewater treatment system for residential septic systems wherein liquid chlorine is drawn into the storage tank to treat sewage effluent. A liquid chlorine supply canister is connected by a supply tube and venturi chamber to a recirculating pipe that discharges the liquid chlorine into a storage-mixing tank. As the effluent is discharged, some of the effluent is recirculated back into the storage-mixing tank to facilitate efficient mixing of the chlorine.

Similarly, U.S. Pat. No. 6,627,071 (the '071 patent) provides a chlorinator for these systems that is designed to discharge a uniform volume of disinfectant. A check valve separates a container from the disinfectant supply, and the check valve limits flow into the container during operation of the effluent pump. After the pumping cycle, the check valve opens to allow the container to refill with disinfectant.

BRIEF SUMMARY OF THE INVENTION

The present invention is a vacuum-actuated liquid chlorine dispenser for use in an aerobic treatment system that allows for more precise doses of disinfectant to be administered. Effluent is diverted from a discharge pipe in an aerobic treatment system into an inlet of a venturi chamber. This resulting pressure differential causes a disinfectant to flow from a supply reservoir into a dosage container until the volume of disinfectant contained by the dosage container causes a pressure control device, such as a float valve, to close. Thereafter, the accumulated disinfectant within the dosage container egresses through a disinfectant outlet that may include a flow regulation device such as a drip emitter.

Because chlorine is added to the effluent contained by the system after a pumping cycle, a known volume of disinfectant can be added to the effluent wherein the volume of added disinfectant is a function of the effluent added to the holding chamber. Because the volume of accumulated disinfectant within the dosage container can be controlled with the pressure control device, the dosage container can consistently be filled with the same volume of disinfectant for each dosing. Therefore, the same volume of chlorine is dispensed into the aerobic treatment system after each pumping cycle. This results in more efficient use of available disinfectant than is disclosed in the prior art.

BRIEF DESCRIPTION OF THE SEVERAL VIEWS OF THE DRAWINGS

The present invention, as well as further objects and features thereof, are more clearly and fully set forth in the following description of the preferred embodiment, which should be read with reference to the accompanying drawings, wherein.

DETAILED DESCRIPTION OF THE INVENTION

Figure 1:
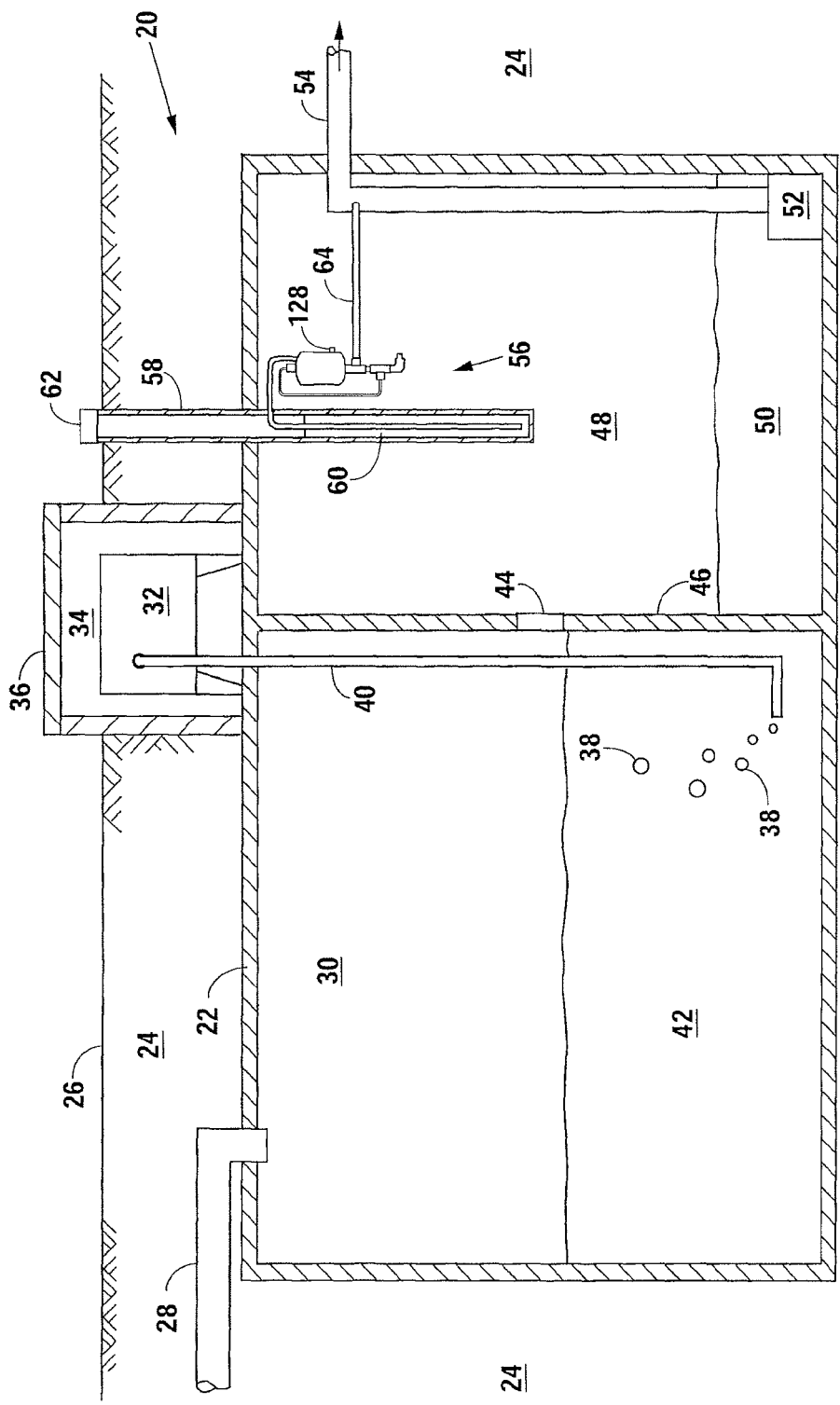
FIG. 1 illustrates a typical aerobic treatment system incorporating the present invention.

FIG. 1 discloses an aerobic treatment system 20 incorporating the present invention and comprising a storage tank 22 buried in the earth 24 beneath a ground surface 26. During operation, sewage flows from an on-site facility, such as a residence, through a sewage pipe 28 into the storage tank 22 and, more specifically, into an aeration chamber 30. Because aerobic bacteria present in the aeration chamber 30 require oxygen to break down the sewage into simple compounds, an air compressor 32, which is contained within a compressor chamber 34 and accessible by removing a cover 36, continuously forces air 38 into the aeration chamber 30 through an aeration hose 40. The sewage breakdown from this aerobic process produces primarily liquid wastewater 42 that flows from the aeration chamber 30 through an opening 44 in a baffle 46 and into a holding chamber 48 as effluent 50. After proper dosing with a disinfectant, a pump 52 moves the effluent through a discharge pipe 54 and into the surrounding environment.

A liquid disinfectant dispenser 56 having the features of the present invention is oriented within the earth 24 and holding chamber 48 to dispense disinfectant into the effluent 50. The dispenser 56 includes a reservoir 58 that is adapted to hold a disinfectant supply 60 and extends above the ground surface 26. The reservoir 58 may be filled as needed by removing the threaded cap 62 from the reservoir 58 and introducing a disinfectant, such as standard household bleach, thereinto. The liquid disinfectant dispenser 56 is in fluid communication with the discharge pipe 54 through a connecting pipe 64. As the pump 52 is actuated to dispense the treated effluent 50 into the environment, a portion of pumped effluent is directed through the connecting pipe 64 and into the dispenser 56, after which it returns to the effluent 50 contained by the holding chamber 48.

Figure 2:
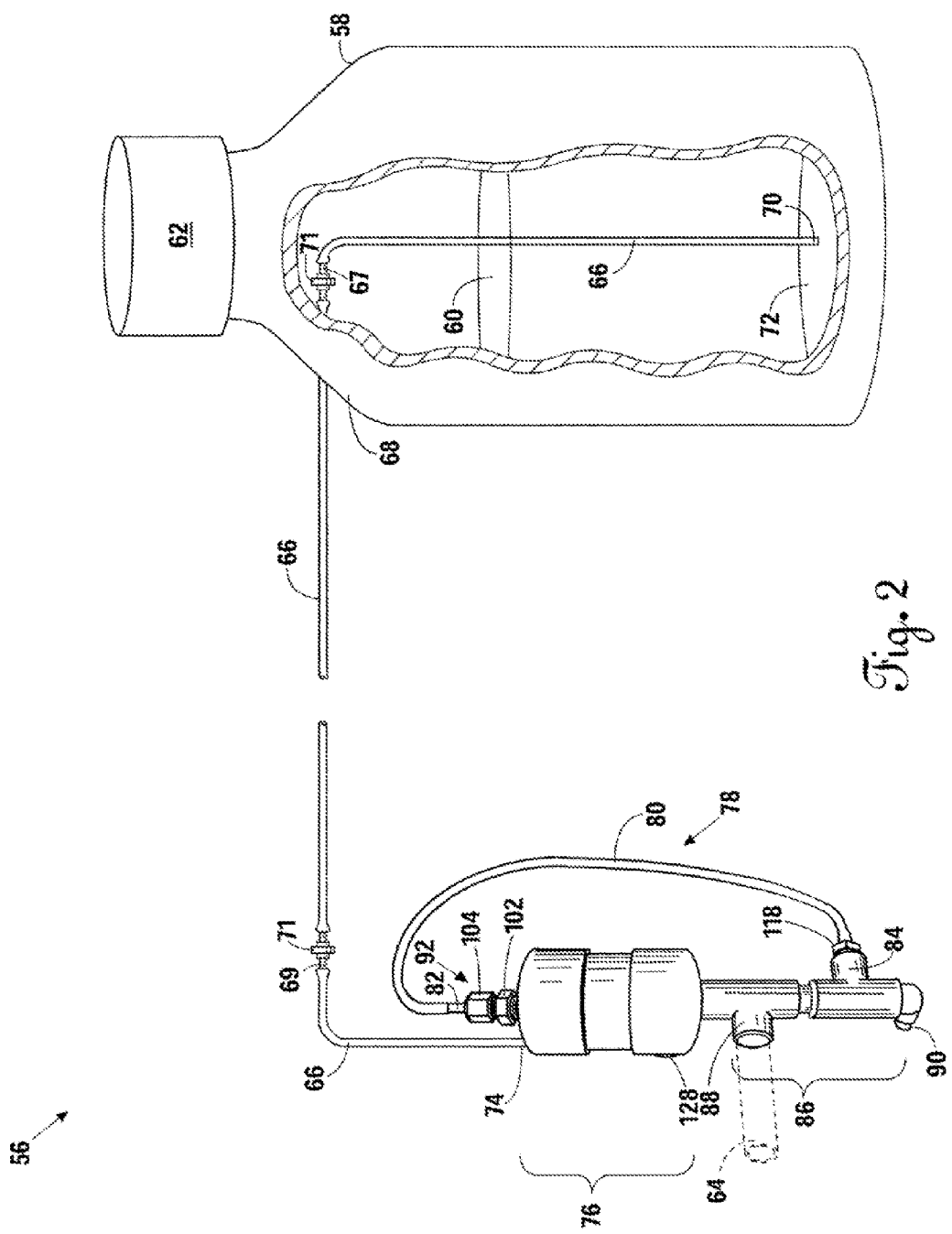
FIG. 2 is a perspective view of the preferred embodiment of the present invention.

FIG. 2 discloses the preferred embodiment of the dispenser 56 in greater detail. The reservoir 58 is adapted to hold the disinfectant supply 60. The cap 62 may be removed from the reservoir 58 to replenish the contained disinfectant supply 60 as needed. Preferably the reservoir 58 and cap 62 are assembled from PVC plumbing components. Because many disinfectants (e.g., bleach) can, over time, be corrosive, the reservoir 58 must be able to withstand such corrosive characteristics.

A disinfectant supply tube 66 is disposed through a sidewall 68 of the reservoir 58 and has a first end 70 oriented near the bottom wall 72 of the reservoir 58 to receive disinfectant therefrom. A second end 74 of the supply tube 66 is mated to a dosage container 76, which is preferably made of PVC plumbing components.

To prevent siphoning after the initiation of disinfectant flow from the reservoir 58, the supply tube 66 incorporates first and second barb couplers 67, 69 in-line therewith, which in the preferred embodiment are Kynar® ⅛" barb couplers with a $^{20}/_{10000}$-inch vent hole 71 drilled therethrough. The first coupler 67 is positioned within the reservoir 58 above the expected maximum level of the disinfectant supply 60. The second coupler 69 is disposed proximal to the second end 74 of the disinfectant supply tube 66. By incorporating the first and second vented barb couplers 67, 69 in-line with the supply tube 66, any siphoning effect that would result after initiation of disinfectant flow through the supply tube 66 due to the reservoir being positioned above the dosage container is negated as air is allowed to enter the supply tube 66 through the vent holes 71. The diameter of the vent holes 71, however, is small enough not to permit flowing disinfectant from exiting the first and second barb couplers 67, 69.

A vacuum tube 78 composed of a flexible tube member 80 attached to a rigid tube member 82 allows pressure communication between the dosage container 76 and a second inlet 84 of a venturi chamber 86 through a hose barb 118. A first inlet 88 of the venturi chamber 86 is connectable to the discharge pipe 54 through the connecting pipe 64 (see FIG. 1). An outlet 90 of the venturi chamber 86 is oriented to dispense effluent into the holding chamber 48. A compression fitting 92 having a compression seat 102 and compression nut 104 allows for adjusting the position of the rigid plastic member 82 of the vacuum tube 78 within the dosage container 76, as will be described in detail hereafter.

Figure 3:
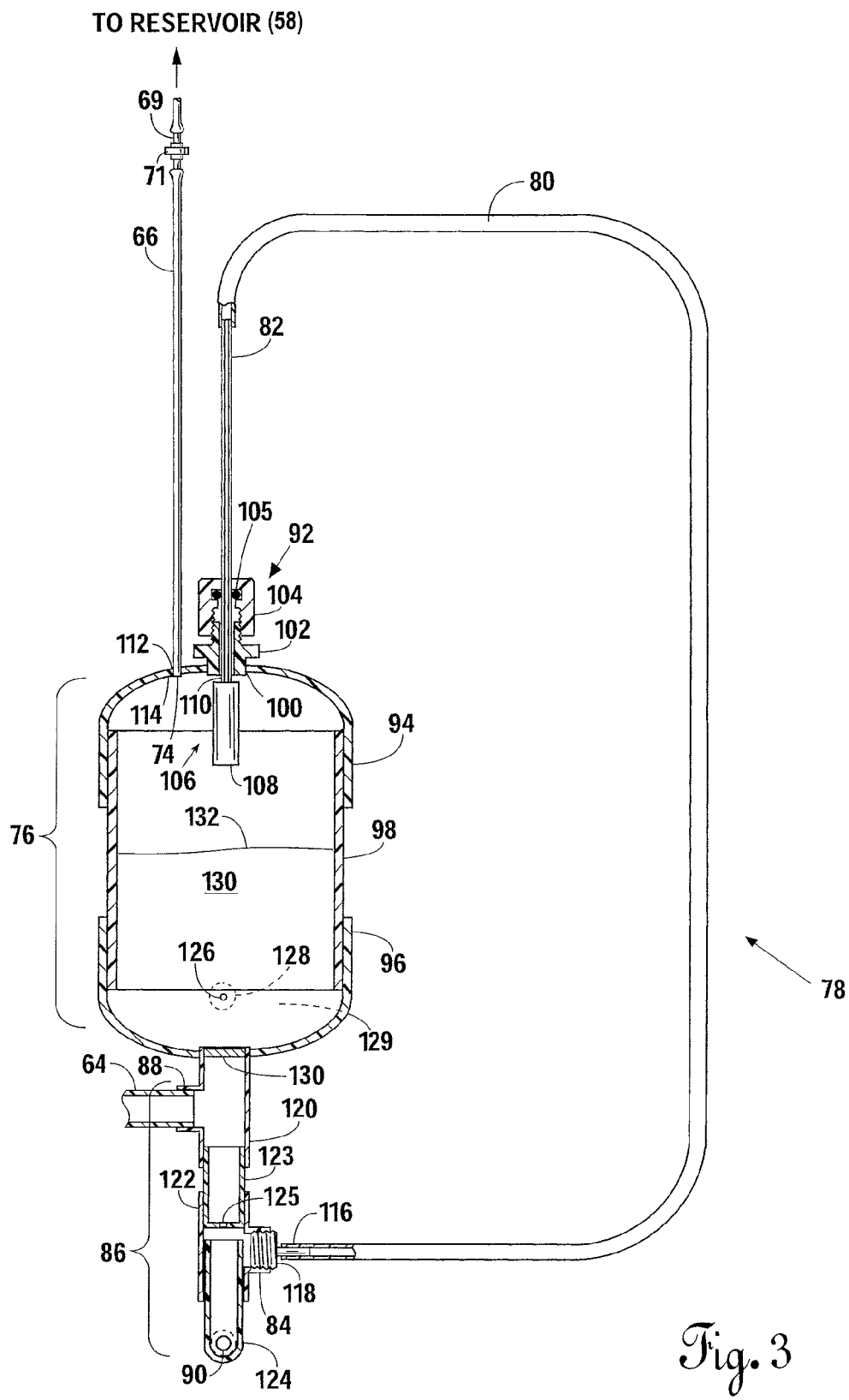
FIG. 3 and FIG. 4 are partial sectional views of the dosage container of the preferred embodiment.
Figure 4:
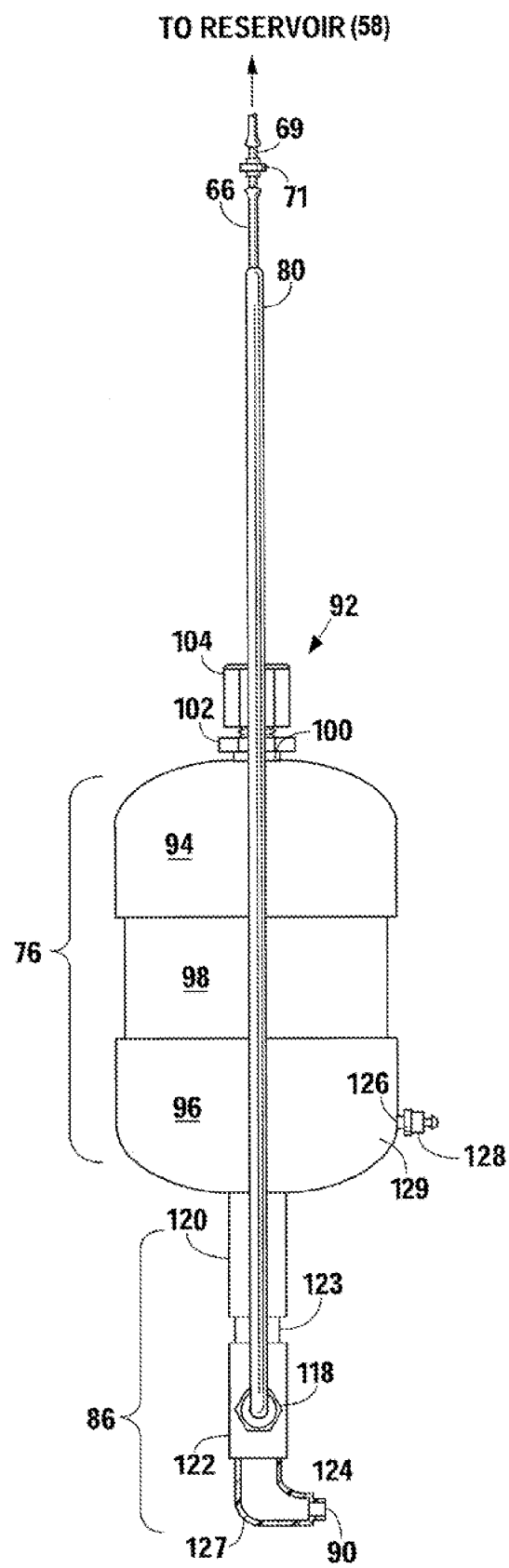

FIG. 3 and FIG. 4 more fully show the dosage container 76 of the preferred embodiment of the present invention along with components of the dispenser connected thereto. The dosage container 76 is composed of a first end cap 94 and second end cap 96 bonded to a pipe member 98 and shaped to contain a fluid therein. The first end cap 94, second end cap 96, and pipe member 98 are preferably PVC, which is known to withstand the corrosive properties of commonly-used disinfectants such as bleach. An opening 100 in the first end cap 94 is threaded to receive the compression seat 102 of the compression fitting 92.

Controlled amounts of disinfectant are dispensed into the holding tank 48 through a disinfectant outlet 126 having a drip emitter 128. The drip emitter 128 is disposed through a sidewall 129 such that accumulated disinfectant 130 will exit therethrough from the interior of the dosage container 76. Drip emitters, or "drippers," control the rate at which fluid passes therethrough, and are commonly used to regulate fluid flow rates. Alternative embodiments contemplate the use of a pressure compensating drip emitter, a check valve, or a bore through the sidewall 129 of the dosage container 76.

The second end 74 of the disinfectant supply tube 66 is mated to a disinfectant inlet 112 disposed through an interior wall 114 of the dosage container 76 using an epoxy or other appropriate bonding agent. Although in the preferred embodiment the second end 74 of the supply tube 66 is substantially flush with the interior wall 114 of the dosage container 76, in alternative embodiments the second end 74 may extend further into the interior of the dosage container 76.

To provide a pressure communication path between the dosage container 76 and venturi chamber 86, the rigid plastic member 82 of the vacuum tube 78 extends into the dosage container 76 through the compression nut 104, the compression seat 102, and threaded opening 100 and has a first end 110 connected to a pressure control device 106 that includes a float valve 108. The positions of the float valve 108 and connected first end 110 of the vacuum tube 78 are adjustable relative to the interior of the dosage container 76 by loosening the compression nut 104 from the compression seat 102, which releases the compressive forces of the enclosed o-ring 105 on the rigid plastic member 82 and allows the first end 110 and float valve 108 to be moved upwardly or downwardly. Similarly, the compression nut 104 may be secured to the compression seat 102, which compresses the o-ring 105 about the rigid plastic member 82 to prevent movement of the first end 110 and float valve 108 relative to the interior of the dosage container 76. The second end 116 of the vacuum tube 78 is attached to a hose barb 118 threadedly mated to the second inlet 84 of the venturi chamber 86.

In the preferred embodiment, the venturi chamber 86 is defined by the interior space of a first T-fitting 120, second T-fitting 122, and a restriction member 123 in combination with a 90-degree elbow 124, although in alternative embodiments include more traditional "in-line" venturi chambers, such as devices commonly used to empty waterbeds or aquariums. The restriction member 123 is bonded to and positioned between the first T-fitting 120 and second T-fitting 122 with a typical PVC bonding agent. The restriction member 123 channels effluent flowing from the first T-fitting 120 through a narrowed orifice 125, causing the effluent flow velocity to increase—and therefore the corresponding pressure to decrease—as the effluent enters the second T-fitting 122. The flowing effluent is then received by the 90-degree elbow 124 and directed through an outlet 90. Although the first T-fitting 120 is structurally connected to the dosage container 76 in the preferred embodiment, such connection does not provide a fluid communication path therebetween as obstruction member 130 blocks fluid communication from the dosage container 76 into the first T-fitting 120.

Operation of preferred embodiment of the present invention begins with actuation of the pump 52, which is typically initiated by a float switch when the effluent 50 reaches a certain level within the holding chamber 48. As the pump 52 moves effluent through the discharge pipe 54, a portion of the effluent is diverted into the connecting pipe 64, from which it is received at the first inlet 88 of the venturi chamber 86 (see FIG. 2, FIG. 3).

Thereafter, the effluent moves through the first T-fitting 120 and through the narrowed orifice 125 of the restriction member 123 disposed between the first T-fitting 120 and second T-fitting 122. As the effluent moves past the second inlet 84 of the venturi chamber 86, a low pressure region (relative to atmospheric pressure) is produced at the second inlet 84 resulting from the increased flow velocity of the effluent, which is commonly referred to as the "venturi effect." This low pressure region exists as long as the pump displaces effluent through the venturi chamber 86.

As the effluent flows through the second T-fitting 122 and contacts the interior of the bend 127 of the 90-degree elbow 124, a backpressure is generated causing effluent to accumulate at the bend 127 of the elbow 124 before egressing through the outlet 90. The backpressure caused by the flow of fluid into the bend 127 of the elbow 124 isolates the second inlet 84 from the surrounding atmospheric pressure, thus allowing the flow of effluent through the venturi chamber 86 to create and maintain the region of reduced pressure at the second inlet 84 thereof.

Because the pressure in the reservoir 58 (see FIG. 2) is atmospheric, a pressure gradient is created between the interior of the reservoir 58 and the second inlet 84 of the venturi chamber 86, causing disinfectant to enter the first end 70 of the supply tube 66 and flow to and into the dosage container 76. As the volume 130 of disinfectant contained within the dosage container 76 increases, the surface 132 of the volume 130 reaches the float valve 108, which then closes to inhibit further pressure communication through the vacuum tube 78.

After the float valve 108 closes, pressure within the dosage container 76 then returns to atmospheric, and the accumulated volume 130 of disinfectant flows out the disinfectant outlet 126 in the sidewall 129 of the dosage container 76. The rate of flow is governed by the specific characteristics of the drip emitter 128. Continued siphoning from the reservoir 58 after closure of the float valve 108 is prevented because atmospheric pressure is communicated into the supply line 66 through the vent hole 71 in the first barb coupler 67 (see FIG. 2) and second barb coupler 69, thus allowing pressure within the dosage container 76 and reservoir 58 to equalize. The dosage container 76 does not refill until the pump 52 once again actuates, causing effluent to flow through the connecting pipe 64 into the venturi chamber 86 and create a region of reduced pressure at the second inlet 84.

The present invention is described above in terms of a preferred illustrative embodiment of a specifically-described liquid disinfectant dispenser and system. Those skilled in the art will recognize that alternative constructions of such a dispenser can be used in carrying out the present invention. Other aspects, features, and advantages of the present invention may be obtained from a study of this disclosure and the drawings, along with the appended claims.

I claim:

1. A liquid disinfectant dispenser for treating wastewater in an aerobic treatment system, said dispenser comprising:
   a reservoir adapted to hold a disinfectant supply;
   a dosage container in fluid communication with said reservoir;
   a venturi chamber having an inlet adapted to receive wastewater from said system;
   a vacuum tube having a first end disposed within said dosage container and a second end connected to said venturi chamber;
   a pressure control device contained within said dosage container and connected to said first end of said vacuum tube to inhibit pressure communication therethrough when a volume of disinfectant within the dosage container is greater than a predetermined amount; and
   a disinfectant outlet disposed through a wall of said dosage container.

2. The liquid disinfectant dispenser of claim 1 wherein said pressure control device is a float valve.

3. The liquid disinfectant dispenser of claim 1 wherein the position of said pressure control device within said dosage container is adjustable.

4. The liquid disinfectant dispenser of claim 1 wherein the disinfectant outlet includes a drip emitter.

5. The liquid disinfectant dispenser of claim 1 wherein the venturi chamber is defined by the interior of a 90-degree elbow and at least one T-fitting in combination with a restriction member having a narrowed orifice therethrough.

6. The liquid disinfectant dispenser of claim 1 further comprising at least one anti-siphoning device positioned in the fluid communication path between said dosage container and said reservoir.

7. The liquid disinfectant dispenser of claim 6 wherein said at least one anti-siphoning device is a barb coupler having a vent hole disposed therethrough.

8. A liquid disinfectant dispenser for treating wastewater in an aerobic treatment system, said dispenser comprising:
   a reservoir adapted to hold a supply of disinfectant;
   a dosage container having a disinfectant inlet and a disinfectant outlet disposed through a wall thereof;
   a disinfectant supply tube having a first end disposed within said reservoir and a second end mated to said disinfectant inlet to provide flow of disinfectant into said dosage container;
   a pipe assembly having a first inlet adapted to receive fluid flow, a second inlet, a restriction member having a narrowed orifice and disposed between said first inlet and said second inlet, and an outlet oriented to discharge said received fluid;
   a vacuum tube having a first end disposed within said dosage container and a second end connected to said second inlet of said pipe assembly; and
   a float valve connected to said first end of said vacuum tube to inhibit fluid communication therethrough when a volume of disinfectant contained within said dosage container reaches a predetermined level.

9. The liquid disinfectant dispenser of claim 8 wherein said disinfectant outlet includes a drip emitter.

10. The liquid disinfectant dispenser of claim 9 wherein said drip emitter is pressure compensating.

11. The liquid disinfectant dispenser of claim 8 wherein said disinfectant outlet includes a check valve.

12. The liquid disinfectant dispenser of claim 8 further comprising at least one anti-siphoning device positioned in-line with said disinfectant supply tube.

13. The liquid disinfectant dispenser of claim 12 wherein said at least one anti-siphoning device is a barb coupler having a vent hole disposed therethrough.

14. An effluent treatment system comprising:
a storage tank having a holding chamber;
an effluent pump contained within said holding chamber;
a discharge pipe connected to said pump providing an effluent communication path to outside said holding chamber;
a reservoir adapted to hold a disinfectant supply;
a dosage container located within said storage tank and in fluid communication with said reservoir;
a venturi chamber having an inlet adapted to receive wastewater from said discharge pipe;
a vacuum tube having a first end disposed within said dosage container and a second end connected to said venturi chamber;
a pressure control device contained within said dosage container and connected to said first end of said vacuum tube to inhibit pressure communication therethrough when a volume of disinfectant within the dosage container is greater than a predetermined amount; and
a disinfectant outlet disposed through a wall of said dosage container.

15. The effluent treatment system of claim 14 wherein said pressure control device is a float valve.

16. The effluent treatment system of claim 14 wherein the position of said pressure control device within said dosage container is adjustable.

17. The effluent treatment system of claim 14 wherein the disinfectant outlet includes a drip emitter.

18. The effluent treatment system of claim 14 wherein the venturi chamber is defined by the interior of a 90-degree elbow and at least one T-fitting in combination with a restriction member having a narrowed orifice therethrough.

19. The effluent treatment system of claim 14 further comprising at least one anti-siphoning device positioned in the fluid communication path between said dosage container and said reservoir.

20. The effluent treatment system of claim 19 wherein said at least one anti-siphoning device is a barb coupler having a vent hole disposed therethrough.

* * * * *